(12) United States Patent
Shu

(10) Patent No.: US 7,205,015 B2
(45) Date of Patent: Apr. 17, 2007

(54) METHOD FOR PRODUCING A JERKED MEAT RAWHIDE CHEW TOY

(76) Inventor: Chia-Lung Shu, 13F, No. 585, Chungkang Rd., Hsinchuang City, Taipei Hsien (TW)

( * ) Notice: Subject to any disclaimer, the term of this patent is extended or adjusted under 35 U.S.C. 154(b) by 433 days.

(21) Appl. No.: 10/603,024

(22) Filed: Jun. 23, 2003

(65) Prior Publication Data

US 2004/0258830 A1 Dec. 23, 2004

(51) Int. Cl.
*A01K 29/00* (2006.01)
*A63H 33/00* (2006.01)

(52) U.S. Cl. .................. 426/89; 426/92; 426/302; 426/305; 426/518; 426/641; 426/805

(58) Field of Classification Search ........ 426/641, 426/516, 518, 302, 305, 89, 92, 805, 132, 426/517
See application file for complete search history.

(56) References Cited

U.S. PATENT DOCUMENTS

| | | | | |
|---|---|---|---|---|
| 3,808,340 | A * | 4/1974 | Palmer | 426/92 |
| 4,590,079 | A * | 5/1986 | Nishimori et al. | 426/265 |
| 5,011,679 | A * | 4/1991 | Spanier et al. | 424/57 |
| 5,673,653 | A * | 10/1997 | Sherrill | 119/709 |
| 5,897,893 | A * | 4/1999 | Mohilef | 426/89 |
| 6,223,693 | B1 * | 5/2001 | Perlberg et al. | 119/707 |
| 6,444,243 | B1 * | 9/2002 | Duensing et al. | 426/132 |
| 6,584,938 | B2 * | 7/2003 | Sherrill et al. | 119/710 |

* cited by examiner

Primary Examiner—C. Sayala
(74) Attorney, Agent, or Firm—William E. Pelton, Esq.; Cooper & Dunham LLP

(57) ABSTRACT

A method for producing a jerked meat rawhide chew toys has steps of forming rawhide chew toys, preparing neat, processing the meat, coating the rawhide chew toys with meat and drying the rawhide chew toys coated with meat. According to the method, the rawhide chew toys are coated with meat and jerked to improve dogs' desire to chew rawhide chew toys a long time to achieve the objective of cleaning dogs' teeth better.

13 Claims, 4 Drawing Sheets

METHOD FOR PRODUCING A JERKED MEAT RAWHIDE CHEW TOY

BACKGROUND OF THE INVENTION

1. Field of the Invention

The present invention relates to a method for producing a rawhide chew toy, and more particularly to a method for producing a jerked meat rawhide chew toy to increase the taste.

2. Description of Related Art

One of the most popular pets in modern society is the ever-faithful dog. Pet owners who pay particular attention to their pets' food are concerned with a balanced diet that includes the judicious use of dog-snacks.

Conventional dog-snacks are used to make teeth stronger and whiter. Rawhide chew toys are a favorite dog-snack. With reference to FIG. 4, a conventional rawhide chew toy (60) is made by breaking rawhide into pieces and extruding the rawhide pieces in a bone shape to encourage a dog to chew the chew toy. However, the conventional rawhide chew toy (60) only exercises a dog's jaw and cleans its teeth and gums. Since the conventional rawhide chew toy (60) does not have meat, dogs quickly lose interest in and chewing the rawhide chew toy (60) even when spice has been added to the rawhide.

SUMMARY OF THE INVENTION

The main objective of the present invention is to provide a method for producing a jerked meat rawhide chew toy to increase the taste.

To achieve the objective, a method for producing a jerked meat rawhide chew toy in accordance with the present invention comprises the steps of forming a rawhide chew toy, preparing meat, processing the meat, coating the rawhide chew toy with meat and drying the rawhide chew toy coated with meat. According to the method, the jerked meat on the rawhide chew toy increases a dog's desire to chew the rawhide chew toy a long time to improve a dog's oral hygiene.

Further benefits and advantages of the present invention will become apparent after a careful reading of the detailed description with appropriate reference to the accompanying drawings.

DETAILED DESCRIPTION OF THE INVENTION

Figure 1:
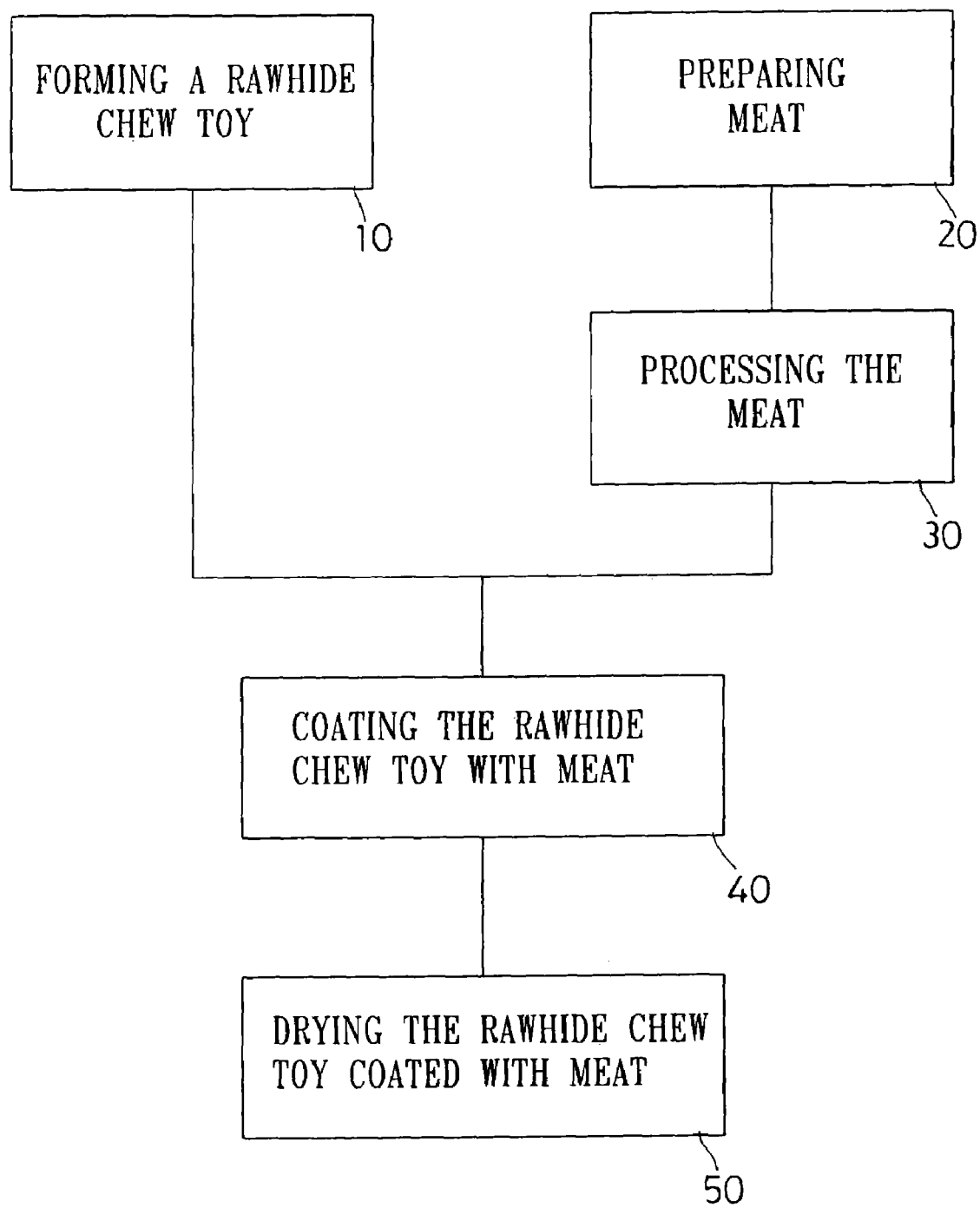
FIG. 1 is a flow chart of a method of producing a jerked meat rawhide chew toy in accordance with the present invention.

With reference to FIG. 1, a method for producing a jerked meat rawhide chew toy in accordance with the present invention comprises the steps of forming a rawhide chew toy (10), preparing meat (20), processing the meat (30), coating the rawhide chew toy with meat (40) and drying the rawhide chew toy coated with meat (50).

The step of forming a rawhide chew toy (10) comprises breaking rawhide into pieces, extruding the broken rawhide in a sheet and then twisting the sheet into bone shape.

The step of preparing meat (20) is in order to maintain the meat fresh and comprises immersing meat of domestic fowl or livestock, for example chicken breast meat and tenderloin, in treatment solution. The treatment solution comprises propylene glycol, sorbitol, vitamin C, potassium sorbate, polyphosphate, sodium nitrite and water. The treatment solution containing 1 wt % propylene glycol, 3 wt % sorbitol, 0.1 wt % vitamin C, 0.2 wt % potassium sorbate, 0.1 wt % polyphosphate, 0.1 wt % sodium nitrite and the remaining is water. The meat is marinated in the treatment solution for 6 hours. The propylene glycol softens the meat. The sorbitol provides an anti-oxidant characteristic to the meat and softens the meat. The vitamin C also provides an anti-oxidant characteristic to the meat. The sodium nitrite makes the meat red and prevents *Clostridium botulinus* from growing. The potassium sorbate acts as a preservative. The polyphosphate increases water retention to improve the rate of producing products and makes the surface of the products tighten and dry.

The step of processing the meat (30) is in order to increase the meat taste and comprises removing the meat from the treatment solution, and drying the meat. Then the meat is ground by a meat grinder, and spices such as ham essence, bacon essence, smoked meat essence and so on are added to the ground meat.

The step of coating the rawhide chew toy with meat (40) comprises either directly spreading the processed meat onto the surface of the rawhide chew toy or using a mold to extrude the processed meat onto the surface of the rawhide chew toy.

The step of drying the rawhide chew toy coated with meat (50) is divided into three phases. The first phase dries the rawhide chew toy coated with meat at room temperature for 3 hours in the presence of fans. The second phase further dries the rawhide chew toy coated with meat in an oven at 50° C. for 3 hours. The third phase completely dries the rawhide chew toy coated with meat in the oven at 70° C. for 15 hours and finishes the jerked meat chew toy.

Figure 2:
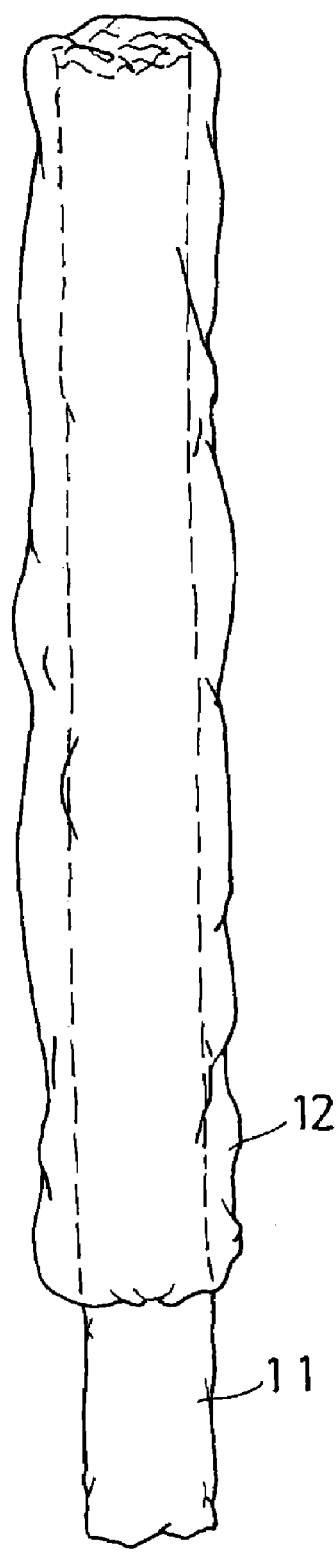
FIG. 2 is a perspective view of a first embodiment of a jerked meat rawhide chew toy produced by the method depicted in FIG. 1.
Figure 3:
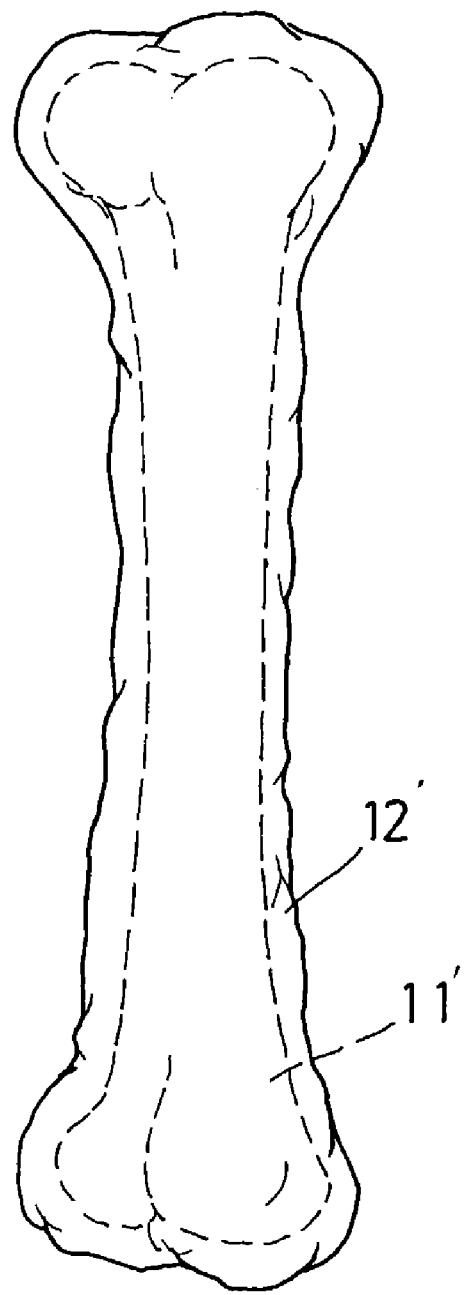
FIG. 3 is a perspective view of a second embodiment of a jerked meat rawhide chew toy produced by the method depicted in FIG. 1.
Figure 4:
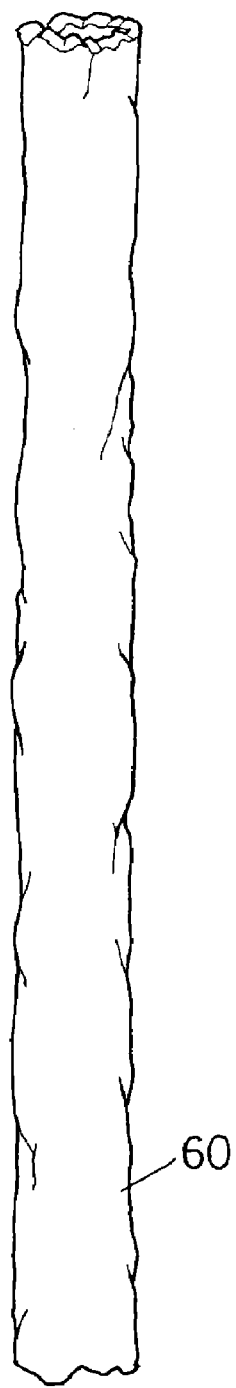
FIG. 4 is a perspective view of conventional rawhide chew toy in accordance with the prior art.

With reference to FIG. 2, a rawhide chew toy (11) is made by using the method in accordance with the present invention to coat the surface of the rawhide chew toy (11) with jerked meat (12). With further reference to FIG. 3, a rawhide chew toy (11') can be made in different shapes, and the surface of the rawhide chew toy (11') is covered with jerked meat (12'). According to the method in accordance with the present invention, the jerked meat (12, 12') on the rawhide chew toy (11, 11') will increase a dog's desire to chew the rawhide chew toy so as to improve a dog's oral hygiene.

Although the invention has been explained in relation to its preferred embodiment, it is to be understood that many other possible modifications and variations can be made without departing from the spirit and scope of the invention as hereinafter claimed.

What is claimed is:

1. A method for producing jerked meat rawhide chew toys comprising the steps of:

forming rawhide chew toys;

immersing meat in a treatment solution that comprises propylene glycol, sorbitol, vitamin C, potassium sorbate, polyphosphate, sodium nitrite and water for 6 hours to maintain the meat fresh;

processing the meat to increase the meat taste;

coating the rawhide chew toys with meat; and drying the rawhide chew toy coated with meat.

2. The method for producing jerked meat rawhide chew toys as claimed in claim 1, wherein the step of forming rawhide chew toys comprises breaking rawhide into pieces, extruding the broken rawhide in a sheet and twisting the sheet into a bone shape.

3. The method for producing ofjerked meat rawhide chew toys as claimed in claim 2 wherein the meat is immerse into the treatment solution containing 1 wt % propylene glycol, 3 wt % sorbitol, 0.1 wt % vitamin C, 0.2 wt % potassium sorbate, 0.1 wt % polyphosphate, 0.1 wt % sodium nitrite and the remaining is water.

4. The method for producing ofjerked meat rawhide chew toys as claimed in claim 2, wherein the step of processing the meat comprises removing the meat from the treatment solution, drying the meat, breaking the meat into pieces and adding spices.

5. The method for producing ofjerked meat rawhide chew toys as claimed in claim 4, wherein the step of coating the rawhide chew toys with meat comprises directly spreading the processed meat on the surface of the rawhide chew toys.

6. The method for producing ofjerked meat rawhide chew toys as claimed in claim 4, wherein the step of coating the rawhide chew toys with meat comprises extruding the processed meat through a mold onto the rawhide chew toys.

7. The method for producing ofjerked meat rawhide chew toys as claimed in claim 5, wherein the step of drying the rawhide chew toys coated with meat is divided into three phases, wherein the first phase comprises drying the rawhide chew toys coated with meat at room temperature for 3 hours in the presence of fans;

the second phase comprises further drying the rawhide chew toys coated with meat in an oven at 50° C. for 3 hours; and the third phase comprises completely drying the rawhide chew toys coated with meat in the oven at 70° C. for 15 hours.

8. The method for producing ofjerked meat rawhide chew toys as claimed in claim 6, wherein the step of drying the rawhide chew toys coated with meat is divided into three phases, wherein the first phase comprises drying the rawhide chew toys coated with meat at room temperature for 3 hours in the presence of fans;

the second phase comprises further drying the rawhide chew toys coated with meat in an oven at 50° C. for 3 hours; and the third phase comprises completely drying the rawhide chew toys coated with meat in the oven at 70° C. for 15 hours.

9. The method for producing of jerked meat rawhide chew toys as claimed in claim 1, wherein the meat is immerse into the treatment solution containing 1 wt % propylene glycol, 3 wt % sorbitol, 0.1 wt % vitamin C, 0.2 wt % potassium sorbate, 0.1 wt % polyphosphate, 0.1 wt % sodium nitrite and the remaining is water.

10. The method for producing of jerked meat rawhide chew toys as claimed in claim 9, wherein the step of processing the meat comprises removing the meat from the treatment solution, drying the meat, breaking the meat into pieces and adding spices.

11. The method for producing of jerked meat rawhide chew toys as claimed in claim 1, wherein the step of coating the rawhide chew toys with meat comprises directly spreading the processed meat on the surface of the rawhide chew toys.

12. The method for producing of jerked meat rawhide chew toys as claimed in claim 1, wherein the step of coating the rawhide chew toys with meat comprises extruding the processed meat through a mold onto the rawhide chew toys.

13. The method for producing of jerked meat rawhide chew toys as claimed in claim 1, wherein the step of drying the rawhide chew toys coated with meat is divided into three phases, wherein the first phase comprises drying the rawhide chew toys coated with meat at room temperature for 3 hours in the presence of fans;

the second phase comprises further drying the rawhide chew toys coated with meat in an oven at 50° C. for 3 hours; and the third phase comprises completely drying the rawhide chew toys coated with meat in the oven at 70° C. for 15 hours.

* * * * *

(12) EX PARTE REEXAMINATION CERTIFICATE (7046th)
United States Patent
Shu

(10) Number: US 7,205,015 C1
(45) Certificate Issued: Sep. 1, 2009

(54) METHOD FOR PRODUCING A JERKED MEAT RAWHIDE CHEW TOY

(75) Inventor: Chia-Lung Shu, Hsinchuang (TW)

(73) Assignee: Petlife International Co., Ltd., San-Chung, Taipei County (TW)

Reexamination Request:
No. 90/010,320, Oct. 16, 2008

Reexamination Certificate for:
Patent No.: 7,205,015
Issued: Apr. 17, 2007
Appl. No.: 10/603,024
Filed: Jun. 23, 2003

(51) Int. Cl.
*A01K 29/00* (2006.01)
*A63H 33/00* (2006.01)

(52) U.S. Cl. .......................... 426/89; 426/302; 426/518; 426/805; 426/92; 426/641; 426/305

(58) Field of Classification Search .................. None
See application file for complete search history.

(56) References Cited

U.S. PATENT DOCUMENTS

| | | |
|---|---|---|
| 3,808,340 A | 4/1974 | Palmer |
| 4,910,038 A | 3/1990 | Ducharme |
| 5,011,679 A | 4/1991 | Spanier et al. |
| 5,476,069 A | 12/1995 | Axelrod |
| 5,635,237 A | 6/1997 | Greenberg et al. |
| 5,673,653 A | 10/1997 | Sherrill |
| 5,897,893 A | 4/1999 | Mohilef |
| 6,444,243 B1 | 9/2002 | Duensing et al. |
| 6,799,536 B1 | 10/2004 | Jia et al. |
| 6,840,196 B2 | 1/2005 | Kirch |
| 2003/0215547 A1 | 11/2003 | Leyh, Jr. |
| 2005/0139167 A1 | 6/2005 | Leo |

OTHER PUBLICATIONS

"Animal Digest," [online] [Retrieved on Oct. 15, 2008] Retrieved from Wikipedia, the free encyclopedia website, <URL:http://en.wikipedia.org/wiki/Animal_digest>.
"AAFCO Definitions of Dog Food Ingredients," [online] [Retrieved on Oct. 15, 2008] Retrieved from braypets.com website, <URL:http://www.braypets.com/FRR/aatcodef.htm>.

*Primary Examiner*—Krisanne Jastrzab

(57) ABSTRACT

A method for producing a jerked meat rawhide chew toys has steps of forming rawhide chew toys, preparing neat, processing the meat, coating the rawhide chew toys with meat and drying the rawhide chew toys coated with meat. According to the method, the rawhide chew toys are coated with meat and jerked to improve dogs' desire to chew rawhide chew toys a long time to achieve the objective of cleaning dogs' teeth better.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–13 is confirmed.

* * * * *